Patented Jan. 18, 1944

2,339,704

UNITED STATES PATENT OFFICE 2,339,704

FOOD PRESERVATIVE

Albert Kiers and Roelof Jan Kiers,
Ladue Village, Mo.

No Drawing. Application September 23, 1940,
Serial No. 357,924

3 Claims. (Cl. 252—407)

This invention relates generally to food preservatives. More particularly, our invention has to do with a preservative agent peculiarly adapted for the preservation of foods containing oleaginous substances that have a tendency to become rancid, such, for example, as dairy products, oleaginous oils, fats, coffee, and the like.

Our invention has for its primary object the provision of a preservative which is uniquely capable of preventing rancidity and other deterioration in food, which is positive in the performance of its preservative action, which, in itself, is inherently stable and retains its efficacy, which is concentrated in form and, therefore, comparatively inexpensive in application, and which is highly efficient in the performance of its stated functions.

Our invention also has for an object the provision of a method of food preservation by which a particular food as, for instance, milk or cream, may be preserved for any selected period of time as may be desired within limits and which enables the treatment of successive batches of the particular food product for preservation over different periods, so that the successive batches when commingled will have a uniform preservative potency.

Numerous other objects and advantages of our invention will be apparent from the following description, which discloses preferred compositions and methods of practicing the invention.

Broadly speaking, our invention contemplates the preparation of a preservative agent consisting of an aqueous solution of an aliphatic diketone and a fruit acid. Such solution may be made up in any particular concentration or strength and added or otherwise applied to the foodstuff to be preserved. Preferably, we employ an aqueous solution of dimethyl diketone, commonly known as butanedione, and citric acid.

This preservative agent is particularly well adapted for use in milk and dairy products to inhibit or prevent rancidity. In such application, we preferably employ an aqueous solution of the following general formula,

|  | Per cent |
|---|---|
| Butanedione | 14 to 24 |
| Citric acid | 0.6 to 3 |
| Distilled water | Q. S. |

In treating milk, we preferably add approximately 5 cc. per gallon of the solution to the milk immediately after it is drawn and thereupon pre-cool the treated milk for approximately twenty-four hours at a temperature preferably between 15° C. to 20° C. Thereafter the milk may be kept at ordinary atmospheric conditions without refrigeration or pasteurization for a period of approximately thirty to thirty-five hours.

We have also found that our preservative agent is effective regardless of whether or not the milk has been pre-cooled after drawing. In such case, however, we find that raw milk treated with 5 cc. per gallon of the above solution will remain fresh for approximately thirty to thirty-five hours after milking. In the case of cream, we have found that smaller quantities of the preservative agent may be employed.

The milk or cream may be maintained in fresh and unspoiled condition for greater or lesser periods of time, depending upon the amount of our preservative agent which is added. This characteristic enables the treatment of successive batches of milk in such manner as to permit commingling thereof for shipment at less frequent intervals. At the present time, considerable difficulty is being experienced in the dairy industry as the result of the tendency on the part of dairy farmers to commingle successive milk drawings, with the result that the earliest milking in the batch may have become slightly soured or tainted and not only impart to the entire quantity an undesirable taste, but actually accelerate the rancidity of even the freshest portions of the quantity. At the present time, in the absence of almost prohibitively expensive refrigeration equipment, this difficulty can be obviated by shipping the milk in relatively small quantities and at very frequent intervals. This latter expedient is, of course, expensive and adds materially to the transportation expense and ultimate cost of the milk or cream. The method of food treatment of the present invention, however, makes it possible to commingle successive milk drawings with facility and safety.

Ordinarily in dairy practice, it is not necessary that milk or cream be kept in an unrefrigerated state for more than forty-eight or fifty-four hours after drawing. To the first drawn batch of milk, we may add approximately 5 cc. per gallon of the preservative agent. To subsequent batches, an aliquot portion of the solution is added, having reference to the proportion of the total period yet to run. For example, if the particular batch being treated has been drawn approximately twenty-four hours after the initial batch, then the preservative agent should be added to the particular batch in the amount of approximately 1½ cc. per gallon. In some cases, it will be found more convenient to prepare the preservative agent in a series of solutions of successively decreasing strength, the strongest being employed to treat the first batch milked or drawn during the period and the weakest being correspondingly employed to treat the last batch milked or drawn during the period. In the latter instance, of course, the same quantity of the several different preservative solutions will be added to each batch, thus simplifying the treating operation for less skilled farm labor.

We have also found that our preservative agent may be employed to prevent rancidity in foodstuffs other than dairy foods. For example, ground coffee when sprayed with our preservative solution will maintain its freshness over unusually prolonged periods of time even under normal atmospheric conditions.

Similarly, we have found that shredded tobacco leaves adapted for pipe and cigarette smoking purposes if sprayed with our preservative solution will maintain freshness for a much longer period of time and will not dry out or become harsh and acrid when consumed by the smoker.

It will thus be evident that, by our present invention, we have provided an extremely efficient food preservative and method of employing the same. Particularly in the dairy industry, the use of a preservative agent in accordance with our present invention makes possible the safe shipment of relatively larger quantities of milk and cream at longer intervals, effecting material savings in transportation costs. In addition, it is possible by the practice of our present invention to ship milk safely without refrigeration from remote and outlying rural areas which are not served by rapid transportation and refrigerated trucking lines.

Finally, the chemical ingredients of our preservative agent are commonly found as natural ingredients in many food products and, therefore, are not deleterious addition agents violative of food and drug regulations.

It will, of course, be understood that, although some particular compositions embodying our present invention and methods of employing the same and also some of the applications of our present invention have been set forth above, nevertheless our invention is not limited to the exact ingredients or proportions or to the precise methods and applications mentioned, the scope of our invention being commensurate with the following claims.

Having thus described our invention, what we claim and desire to secure by Letters Patent is,

1. A preservative agent containing 14%–24% of butanedione in aqueous solution.

2. A preservative for inhibiting rancidity in food comprising an aqueous solution containing from 14% to 24% of butanedione and 0.6% to 3% of citric acid.

3. A preservative agent for use in milk and dairy products to inhibit rancidity consisting of an aqueous solution containing 14%–24% of butanedione, and 0.6%–3% citric acid.

ALBERT KIERS.
ROELOF JAN KIERS.